(12) United States Patent
Belpaire et al.

(10) Patent No.: US 11,312,423 B2
(45) Date of Patent: Apr. 26, 2022

(54) DEVICE FOR REINFORCING A STRUCTURAL ELEMENT

(71) Applicant: SIKA TECHNOLOGY AG, Baar (CH)

(72) Inventors: Vincent Belpaire, Uccle (BE); Ardi Shehu, Rotselaar (BE)

(73) Assignee: SIKA TECHNOLOGY AG, Baar (CH)

( * ) Notice: Subject to any disclaimer, the term of this patent is extended or adjusted under 35 U.S.C. 154(b) by 47 days.

(21) Appl. No.: 16/764,465

(22) PCT Filed: Nov. 9, 2018

(86) PCT No.: PCT/EP2018/080781
§ 371 (c)(1),
(2) Date: May 15, 2020

(87) PCT Pub. No.: WO2019/096694
PCT Pub. Date: May 23, 2019

(65) Prior Publication Data
US 2020/0353996 A1    Nov. 12, 2020

(30) Foreign Application Priority Data
Nov. 15, 2017  (EP) .................................... 17201948

(51) Int. Cl.
*B60J 7/00*  (2006.01)
*B62D 29/00*  (2006.01)
*B62D 29/04*  (2006.01)

(52) U.S. Cl.
CPC ......... *B62D 29/005* (2013.01); *B62D 29/041* (2013.01)

(58) Field of Classification Search
CPC .... B01D 35/147; B01D 35/15; B61D 45/007; G06F 11/3409; G06F 11/3433;
(Continued)

(56) References Cited

U.S. PATENT DOCUMENTS 5,755,486 A * 5/1998 Wycech .................. B29C 70/78
296/187.02
6,058,673 A * 5/2000 Wycech .................. B29C 44/18
52/834
(Continued)

FOREIGN PATENT DOCUMENTS

DE  10 2011 117 951 A1   5/2012
EP      2 154 052 A1   2/2010
GB      2 375 328 A   11/2002

OTHER PUBLICATIONS

May 19, 2020 International Preliminary Report on Patentability issued in International Patent Application No. PCT/EP2018/080781.

(Continued)

*Primary Examiner* — Kiran B Patel
(74) *Attorney, Agent, or Firm* — Oliff PLC

(57) ABSTRACT

A device for reinforcing a structural element in a motor vehicle including a reinforcing element, which has a longitudinal axis and which can be arranged in a cavity of the structural element. The reinforcing element includes walls which extend substantially in the direction of the longitudinal axis. The reinforcing element additionally includes at least one open side, which likewise extends in the direction of the longitudinal axis. The walls directly adjoining the open side are designed in a convergent manner in that extensions of said adjoining walls running in the direction of the open side and perpendicularly to the longitudinal axis intersect.

15 Claims, 5 Drawing Sheets

(58) Field of Classification Search
CPC ....... H01L 2924/00; H01L 2924/12042; C04B 38/08; C04B 41/009; C08F 36/04
See application file for complete search history.

(56) References Cited

U.S. PATENT DOCUMENTS

| | | | | |
|---|---|---|---|---|
| 6,092,864 A * | 7/2000 | Wycech | ................ | B29C 44/188 296/187.02 |
| 6,165,588 A * | 12/2000 | Wycech | ............... | B62D 29/002 428/122 |
| 6,341,467 B1 * | 1/2002 | Wycech | ................. | B29C 44/18 296/193.06 |
| 6,467,834 B1 * | 10/2002 | Barz | ...................... | B62D 25/04 296/187.02 |
| 2001/0042353 A1 * | 11/2001 | Honda | .................... | B29C 44/18 296/146.6 |
| 2002/0074827 A1 * | 6/2002 | Fitzgerald | ............ | B62D 29/002 296/187.02 |
| 2002/0174954 A1 | 11/2002 | Busseuil et al. | | |
| 2003/0090129 A1 * | 5/2003 | Riley | .................... | B62D 21/152 296/203.03 |
| 2003/0137162 A1 * | 7/2003 | Kropfeld | ............. | B62D 29/002 296/203.01 |
| 2004/0046421 A1 * | 3/2004 | Barz | ..................... | B62D 29/002 296/187.02 |
| 2004/0221953 A1 * | 11/2004 | Czaplicki | ................ | C08L 63/00 156/293 |
| 2005/0016807 A1 * | 1/2005 | Braymand | ............... | F16F 7/121 188/371 |
| 2005/0276970 A1 | 12/2005 | Busseuil et al. | | |
| 2007/0277926 A1 * | 12/2007 | Naughton | ............ | B62D 29/004 156/243 |
| 2008/0029200 A1 * | 2/2008 | Sheasley | ................. | C08L 63/00 156/79 |
| 2008/0217960 A1 * | 9/2008 | Kochert | ................. | C25D 13/14 296/193.06 |
| 2008/0296164 A1 * | 12/2008 | Dajek | .................. | B62D 29/004 205/80 |
| 2009/0085379 A1 * | 4/2009 | Takahashi | ............... | B62D 25/04 296/193.06 |
| 2010/0028651 A1 * | 2/2010 | Golden | .................. | B62D 21/15 428/317.5 |
| 2010/0092733 A1 * | 4/2010 | Blank | ................... | B29C 66/112 428/174 |
| 2011/0049323 A1 * | 3/2011 | Belpaire | ............... | B62D 29/002 248/351 |
| 2011/0206890 A1 | 8/2011 | Belpaire et al. | | |
| 2011/0210581 A1 * | 9/2011 | Kunishi | .................. | B62D 25/04 296/193.01 |
| 2011/0236610 A1 * | 9/2011 | Belpaire | ............... | B62D 29/004 428/34.1 |
| 2012/0043019 A1 * | 2/2012 | Belpaire | ............... | B29C 44/1228 156/293 |
| 2012/0119546 A1 | 5/2012 | Honda et al. | | |
| 2012/0141724 A1 * | 6/2012 | Belpaire | ............... | B62D 29/002 428/99 |
| 2012/0280534 A1 * | 11/2012 | Eipper | ................. | B62D 29/005 296/187.01 |
| 2013/0037152 A1 * | 2/2013 | Belpaire | ............... | B62D 29/002 138/37 |
| 2013/0133771 A1 * | 5/2013 | Richardson | ............ | B62D 25/04 138/109 |
| 2015/0165737 A1 * | 6/2015 | Richardson | ............. | B32B 5/024 428/172 |
| 2016/0016609 A1 | 1/2016 | Kurokawa | | |
| 2016/0200371 A1 * | 7/2016 | Inamoto | ............... | B62D 25/025 296/203.01 |
| 2016/0229456 A1 * | 8/2016 | Boettcher | ............ | B62D 27/026 |
| 2017/0036701 A1 | 2/2017 | Yamada et al. | | |
| 2017/0203796 A1 | 7/2017 | Belpaire et al. | | |
| 2018/0015957 A1 * | 1/2018 | Kishima | ............... | B62D 29/002 |
| 2018/0022397 A1 * | 1/2018 | Richardson | .......... | B62D 29/002 296/187.03 |
| 2019/0144041 A1 * | 5/2019 | Belpaire | ............... | B62D 29/005 296/209 |
| 2019/0144047 A1 * | 5/2019 | Belpaire | ............... | B62D 29/002 296/202 |
| 2019/0144049 A1 * | 5/2019 | Belpaire | ................ | B62D 25/04 296/187.01 |
| 2019/0144050 A1 * | 5/2019 | Belpaire | ............... | B62D 25/04 296/187.01 |
| 2019/0224947 A1 * | 7/2019 | Munzinger | ......... | B29C 66/5326 |
| 2019/0382056 A1 * | 12/2019 | Shantz | .................. | B62D 27/02 |
| 2020/0361544 A1 * | 11/2020 | Munzinger | .......... | B62D 27/026 |
| 2021/0039718 A1 * | 2/2021 | Koga | ...................... | B60R 19/18 |

OTHER PUBLICATIONS

Feb. 15, 2019 International Search Report issued International Patent Application No. PCT/EP2018/080781.

* cited by examiner

DEVICE FOR REINFORCING A STRUCTURAL ELEMENT

The present invention relates to a device for reinforcing a structural element in a motor vehicle, as well as to a system of a reinforced structural element in a motor vehicle.

Construction elements such as, for example, bodies and/or chassis frames of transportation and conveyance means, in particular of aquatic or terrestrial vehicles or of aircraft, in many instances have structures having cavities in order for lightweight constructions to be enabled. However, these cavities cause a wide variety of problems. Depending on the type of the cavity, the latter has to be sealed in order to prevent the ingress of moisture and contaminations which can lead to corrosion of the construction elements. It is often also desirable for the cavities and thus the construction element to be substantially reinforced but for the low weight to be maintained. It is often also necessary for the cavities and thus the construction elements to be stabilized in order for noises which would otherwise be transmitted along the cavity or through the latter to be reduced. Many of these cavities have an irregular shape or tight dimensions, on account of which it becomes difficult to properly seal, reinforce, and insulate said cavities.

Sealing elements (baffles) are therefore used in particular in the automotive industry but also in the aviation and nautical industry in order for cavities to be sealed and/or to be acoustically closed off, or reinforcing elements (reinforcers) are used in order for cavities to be reinforced.

A body of an automobile is schematically illustrated in FIG. 1a. The body 10 herein has various structures having cavities such as, for example, pillars 14 and supports or stays 12, respectively. Such structural elements 12, 14 having cavities are usually sealed or reinforced, respectively, using sealing and/or reinforcement elements 16.

A cross section through a structural element 12, 14 is schematically illustrated in FIG. 1b. It is often the case in such structural elements 12, 14, that a first panel sheet 4 and a second panel sheet 5 are joined together at joints 6, 7, wherein the panel sheets 4, 5 configure a cavity 3 between the joints 6, 7.

Various approaches have already been taken in order for such structural elements 12, 14 having cavities 3 to be reinforced. It is furthermore desirable to reinforce such structural elements 12, 14 with reinforcing elements 16 which are as light as possible.

The invention is therefore based on the object of making available an improved system of a reinforced structural element of a motor vehicle. Requirements such as arise in components having cases of particularly high loads are to be able to be better met in particular herein.

This object is achieved by a device for reinforcing a structural element in a motor vehicle, said device comprising: a reinforcing element, which has a longitudinal axis and which can be arranged in a cavity of the structural element, wherein the reinforcing element comprises walls which extend substantially in the direction of the longitudinal axis, and wherein the reinforcing element comprises at least one open side, which likewise extends in the direction of the longitudinal axis, wherein the walls directly adjoining the open side are designed in a convergent manner in that extensions of said adjoining walls running in the direction of the open side and perpendicularly to the longitudinal axis intersect.

This solution has the advantage that devices for reinforcing a structural element which enable the reinforcing element to be better attached to the structural element can be made available on account thereof. By virtue of the converging walls which adjoin the open side, there is fundamentally more surface area of the reinforcing element available for attachment to the structural element.

It is a core concept of the present invention to provide a reinforcing element which, on account of a suitable cross section, has improved mechanical properties, a larger attachment surface for adhesive bonding to the structural element and, overall, improved reinforcement of the structural element. It has been demonstrated herein that reinforcing elements which have converging walls are better suited to meeting said requirements than reinforcing elements having walls that do not converge.

In one exemplary embodiment, the reinforcing element has a first side wall and a second side wall, and a connecting wall that connects the side walls.

In one exemplary embodiment, the first side wall comprises a first partial wall and a second partial wall, wherein the partial walls are not in the same plane.

In one exemplary embodiment, the second side wall comprises a first partial wall and a second partial wall, wherein the partial walls are not in the same plane.

The provision of partial walls which are not in the same plane has the advantage that, as a result, side walls can be matched better to the geometry of the structural element. Particularly in the region of joints at which the panel sheets of the structural element are joined, it is advantageous to provide side walls which follow the geometries of the structural element. This is more easily possible with partial walls than with straight walls which lie in just one plane.

In one exemplary embodiment, the connecting wall is arranged in such a way that the side walls extend on the same side of the connecting wall.

In an alternative embodiment, the connecting wall is arranged in such a way that the side walls extend on different sides of the connecting wall.

In one exemplary embodiment, an angle which is formed by the converging extensions of the adjoining walls is between 0° and 180°, or between 0° and 150°, or between 0° and 120°, or between 0° and 90°, or between 0° and 60°.

In one exemplary embodiment, the reinforcing element comprises ribs which are oriented substantially orthogonally to the longitudinal axis of the reinforcing element, and which interconnect the first side wall and the second side wall.

Such ribs offer the advantage that, on account thereof, a mechanical load-bearing capability of the reinforcing element per se can be further improved.

In one exemplary embodiment, the walls are formed from the same material.

In one exemplary embodiment, the reinforcing element contains metal, steel, aluminum, magnesium, plastics material, fiber-reinforced plastics material, organic sheet material, or a combination of said materials.

The object set at the outset is moreover achieved by a system of a reinforced structural element in a motor vehicle, wherein the system comprises: a structural element; a reinforcing element, wherein the reinforcing element is disposed in the structural element; and an adhesive, wherein the adhesive interconnects the reinforcing element and the structural element. In this case, the reinforcing element is designed in accordance with the above description.

In one exemplary embodiment, the adhesive has an expansion rate of less than 500%, or less than 400%, or less than 300%, or the adhesive is a non-expandable adhesive.

Materials which are expandable to a lesser degree, or non-expandable materials, offer the advantage that the adhesive, on account thereof, does not lose mechanical stability to an excessive degree on expansion. In principle, a material becomes mechanically weaker the more the material is expanded.

SikaReinforcer®-940 or SikaPower®-497 in particular are examples of adhesives which are non-expandable or expandable to a lesser degree. SikaReinforcer®-940 herein is an example of an expandable material, whereas Sika-Power®-497 is an example of a non-expandable material.

In the context of this invention, the term "non-expandable" means that a material does not change its volume by more or less than 10% during the process steps provided for the material. For example, non-expandable adhesives may shrink slightly during curing. Such a change in volume during curing is considered to be "non-expandable" in the context of this application.

In one exemplary embodiment, the adhesive is curable at a temperature of more than 120°.

In a further alternative embodiment, the system comprises a first adhesive and a second adhesive, wherein the adhesives have dissimilar properties, in particular in terms of expansion and/or curing and/or a mating capability and/or a mechanical load-bearing capacity.

In one exemplary embodiment, the adhesive is a tape adhesive, a shape memory adhesive, an injectable adhesive, an injection-molded adhesive or an extruded adhesive.

In one exemplary embodiment, the adhesive connects at least the first side wall and the second side wall to the structural element.

In one exemplary embodiment, the adhesive connects the connecting wall to the structural element.

In one exemplary embodiment, the adhesive in a region of a first joint and/or in a region of a second joint of the structural element forms a continuous layer such that the reinforcing element in this region is connected both to a first panel sheet and to a second panel sheet.

This is of advantage because an improvement in the reinforcement of the entire system is achievable on account of a reinforcement of the structural element in the regions of the joints by way of the reinforcing element.

In one exemplary embodiment, at least 50%, or at least 60%, or at least 70%, of an inner circumference of the structural element, formed from the first panel sheet and the second panel sheet, in a cross section of the structural element is connected to the reinforcing element by the adhesive.

It has been found that a connecting surface between the reinforcing element and the structural element which is as large as possible is advantageous in order to improve the overall system in respect of mechanical load-bearing capacity.

The reinforcing element proposed here can be produced by a three-dimensional printing method, for example.

Details and advantages of the invention will be described below on the basis of exemplary embodiments and with reference to schematic drawings.

Figure 1A:
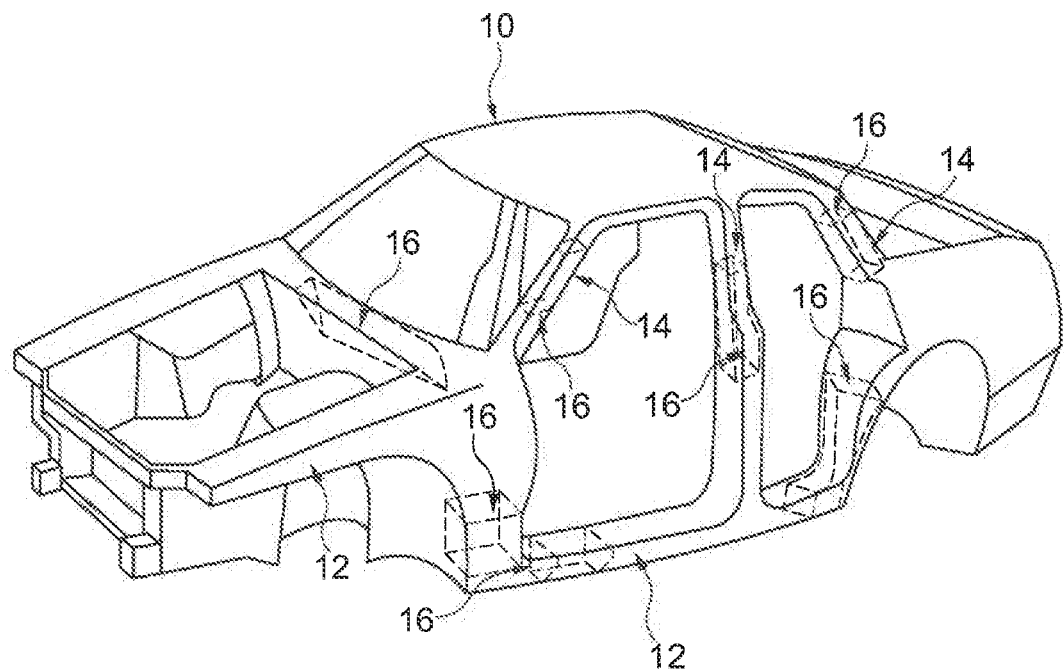
FIG. 1a shows a schematic illustration of a body.
Figure 1B:
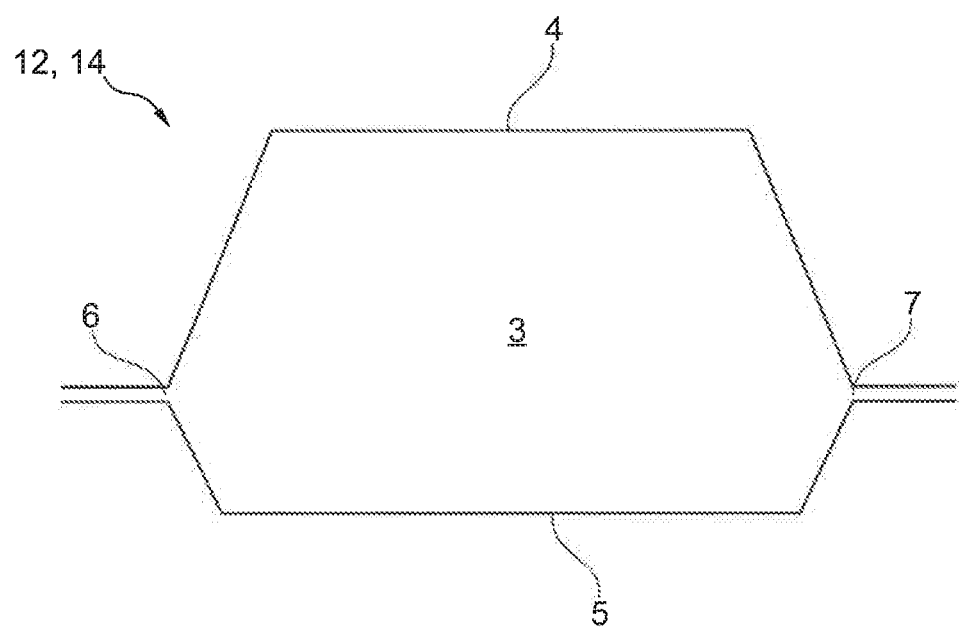
FIG. 1b shows a schematic illustration of a cross section through a structural element.
Figure 2A:
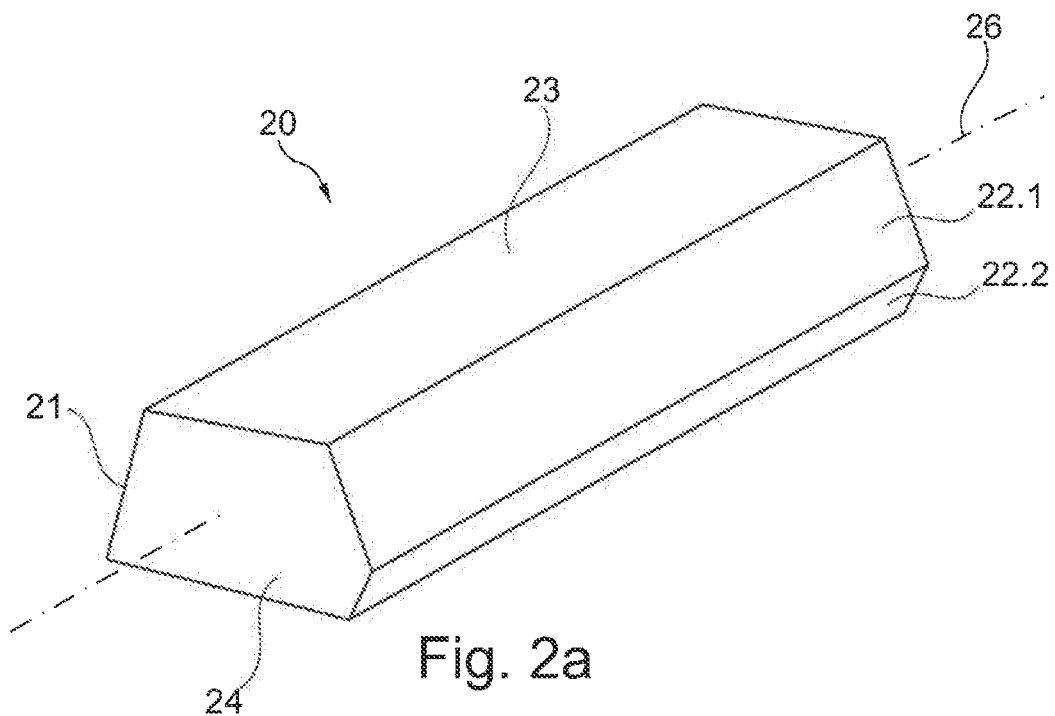
FIGS. 2a and 2b show a schematic illustration of a reinforcing element.
Figure 2B:
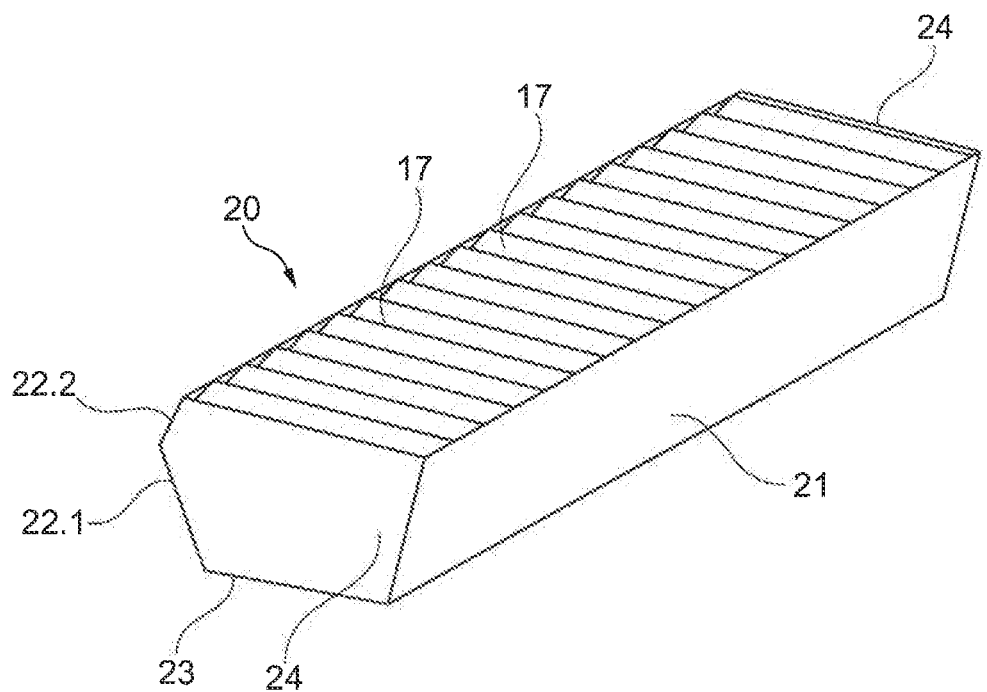

An exemplary reinforcing element 20 is shown in three dimensions in FIGS. 2a and 2b. Here, the reinforcing element 20 has a longitudinal axis 26 and walls 21, 22, 23, which extend in the direction of the longitudinal axis 26. In this case, a first side wall 21, a connecting wall 23 and a second side wall 22 are arranged adjacent to one another. In this exemplary embodiment, the second side wall 22 is divided into a first partial wall 22.1 and a second partial wall 22.2. The reinforcing element 20 has an open side, which, in this exemplary embodiment, is situated between the first side wall 21 and the second partial wall 22.2 of the second side wall 22. The reinforcing element 20 moreover has a front and a rear wall 24. Moreover, the reinforcing element 20 comprises ribs 17, which, in this exemplary embodiment, are arranged parallel to the front and rear walls 24. In this exemplary embodiment, the ribs 17 interconnect all the walls 21, 22, 23 oriented along the longitudinal axis 26.

Various cross sections through a system 1 of a reinforced structural element 12, 14 are illustrated in FIGS. 3a to 4b. One reinforcing element 20 herein is in each case disposed in a cavity 3 of the structural element 12, 14. The reinforcing element 20 herein is connected to the structural element 12, 14 by way of an adhesive 13.

Figure 3A:
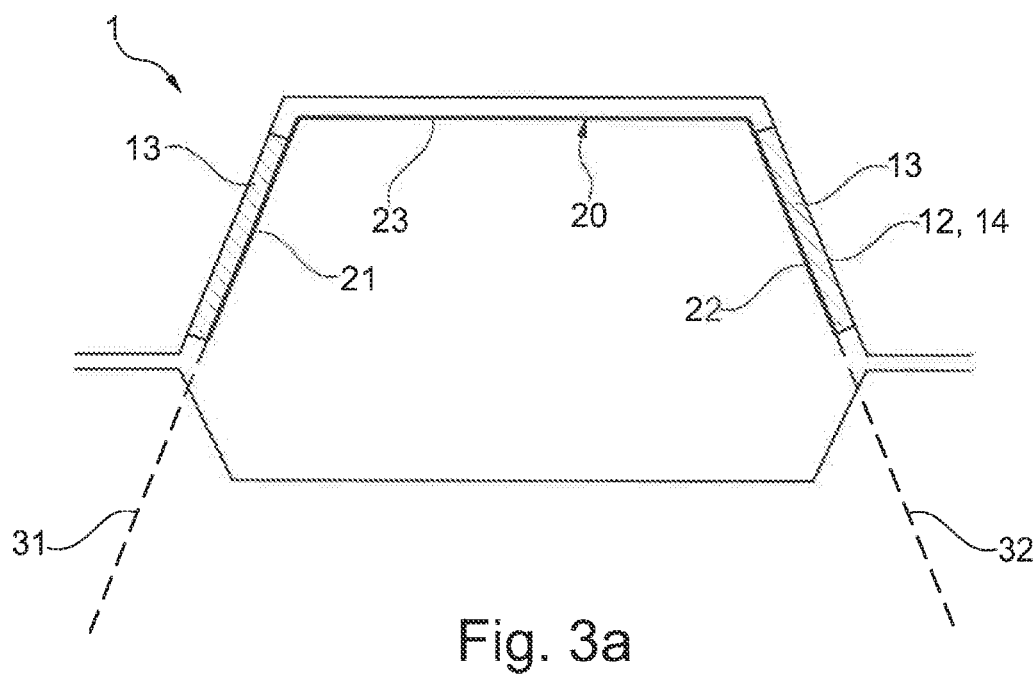
FIGS. 3a to 4d show a schematic illustration of a system of a reinforced structural element.
Figure 3B:
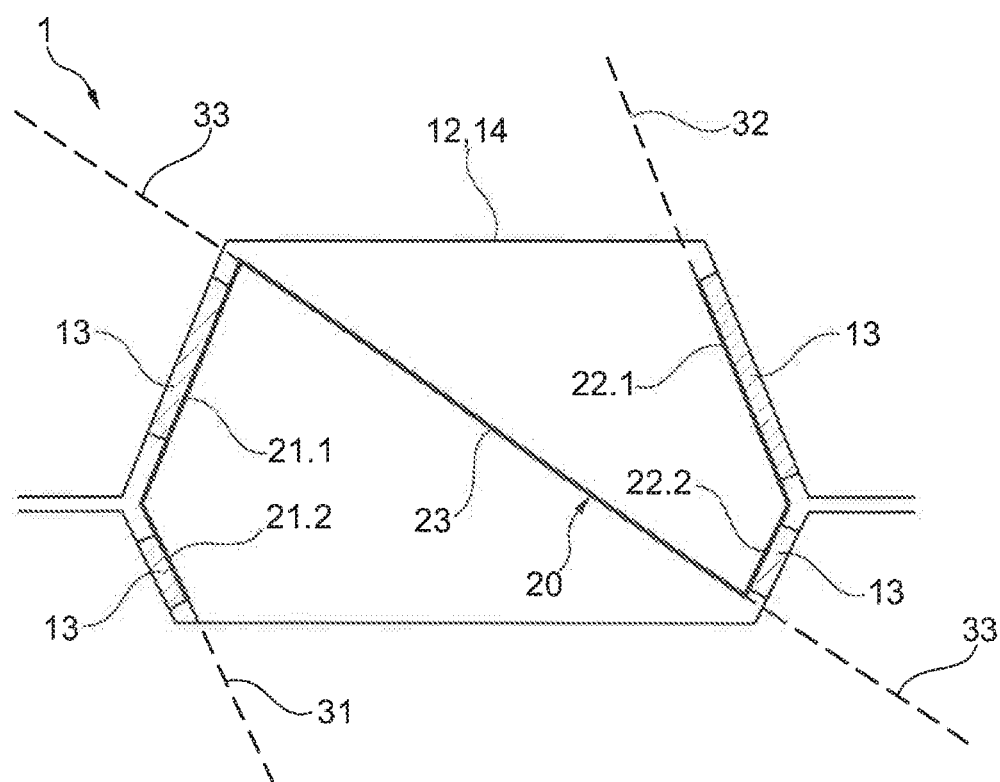

FIGS. 3a and 3b illustrate two different exemplary embodiments, in which the walls 21, 22 directly adjoining the open side are designed in a non-convergent manner. This is evident particularly from the fact that the extension 31 of the first side wall 21, the extension 32 of the second side wall 22 and the extension 33 of the connecting wall 23, which each run in the direction of the open side perpendicularly to the longitudinal axis of the reinforcing element 20, do not intersect.

In FIGS. 4a to 4d, in contrast, four different exemplary embodiments in which the extensions 31, 32, 33 of the adjoining side walls 21, 22, 23 intersect are illustrated schematically. In these exemplary embodiments, accordingly, the walls 21, 22, 23 adjoining the directly open side are designed in a convergent manner.

Figure 4A:
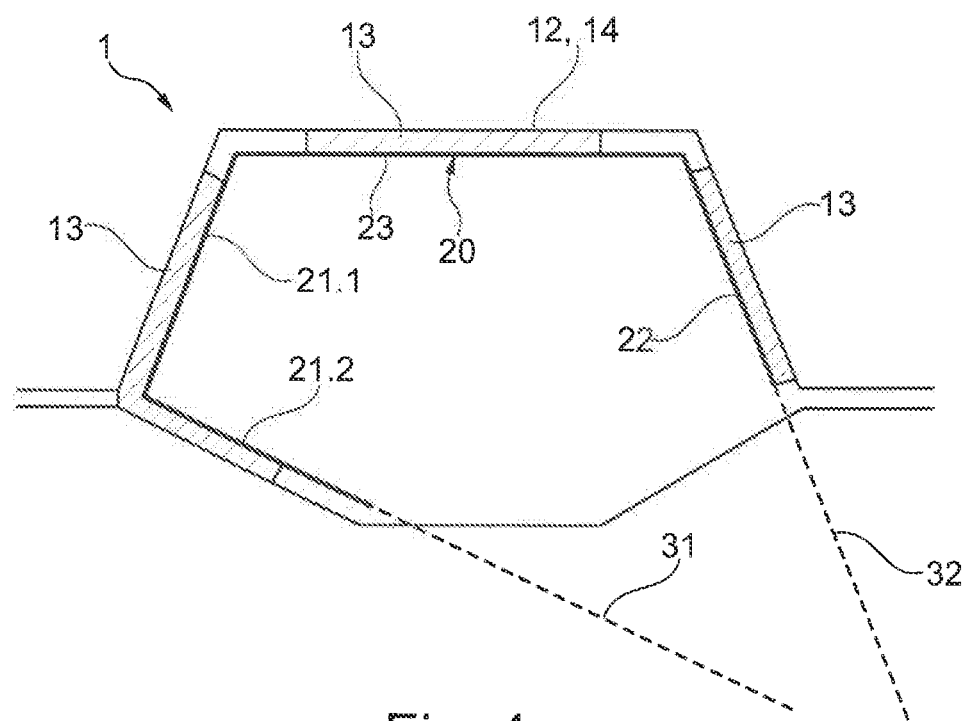

In FIG. 4a, the first partial wall 21.2 of the first side wall 21 and the second side wall 22 directly adjoins the open side. The extension 31 of the first side wall 21 and the extension 32 of the second side wall 22 intersect one another. In comparison with the embodiment shown in FIG. 3a, the reinforcing element 20 in this exemplary embodiment has a larger surface area for adhesive bonding to the structural element 12, 14.

Figure 4B:
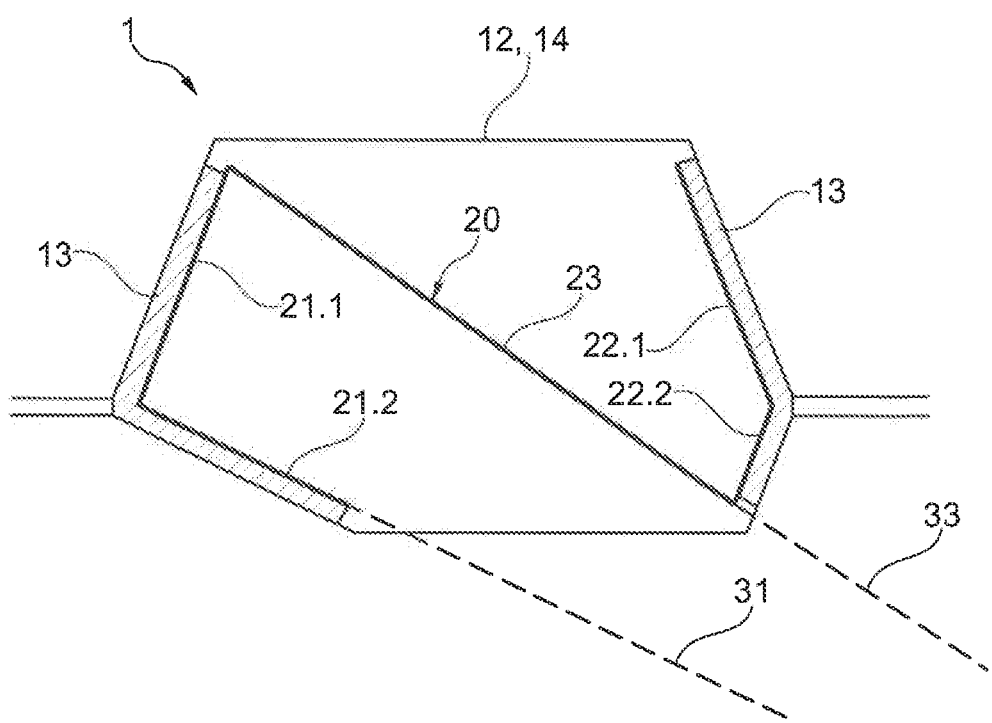

Another exemplary embodiment having converging walls 21, 22, 23 is illustrated in FIG. 4b. In this exemplary embodiment, the connecting wall 23 is arranged substantially diagonally. Here, the second partial wall 21.2 of the first side wall 21 and the connecting wall 23 are the walls directly adjoining the open side. Since the extensions 31, 33 of these directly adjoining walls 21.2, 23 intersect, these directly adjoining walls 21.2, 23 are designed in a convergent manner.

Figure 4C:
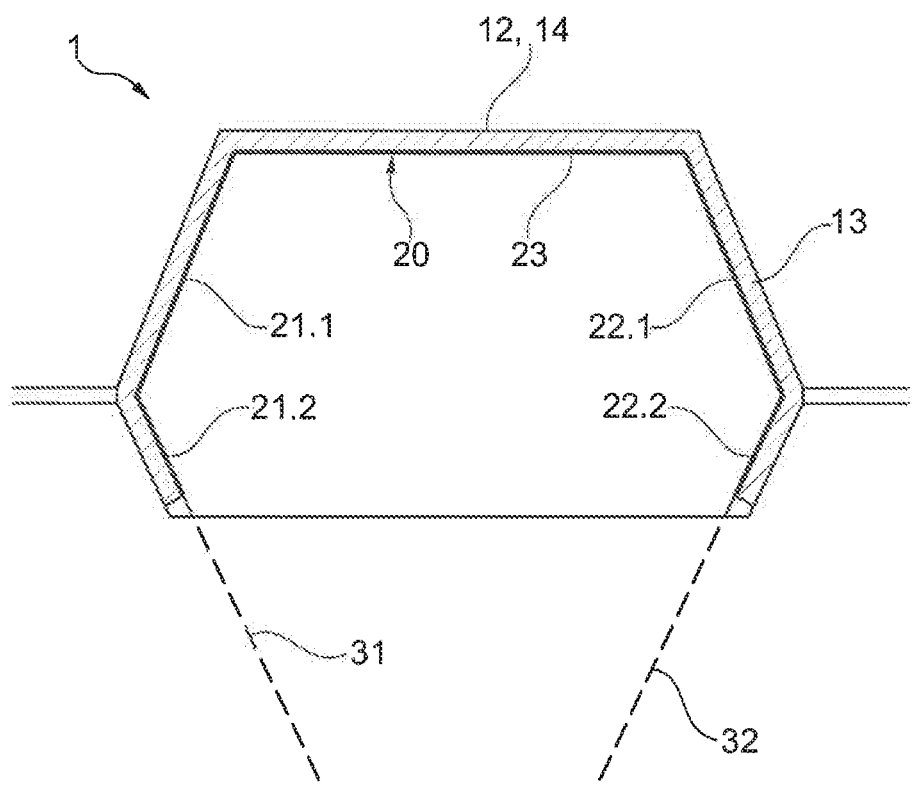

Another embodiment having converging walls 21, 22, 23 is illustrated in FIG. 4c. Here, the second partial wall 21.2 of the first side wall 21 and the second partial wall 22.2 of the second side wall 22 are the walls directly adjoining the open side. Once again, the extensions 31, 32 of the corresponding walls 21.2, 22.2 intersect one another.

Figure 4D:
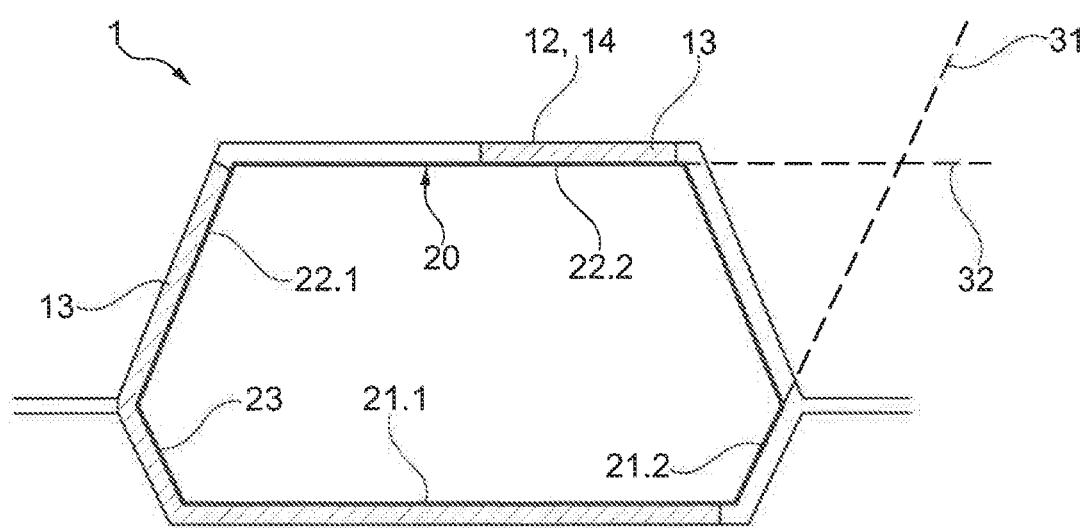

Another exemplary embodiment having converging walls 21, 22, 23 is illustrated in FIG. 4d. Here, in contrast to the exemplary embodiment in FIG. 4c, the open side of the reinforcing element 20 is arranged in a different region of the structural element 12, 14. Once again, the extensions 31, 32 of the walls 21.2, 22.2 directly adjoining the open side intersect one another. Thus, here too, the walls 21.2, 22.2 directly adjoining the open side are designed in a convergent manner.

LIST OF REFERENCE SIGNS

1 System
3 Cavity
4 First panel sheet
5 Second panel sheet
6 First joint
7 Second joint
10 Body
12 Structural element
13 Adhesive
14 Structural element
16 Device
20 Reinforcing element
21 First side wall
22 Second side wall
23 Connecting wall
24 Front/rear wall
26 Longitudinal axis
31 Extension of the first side wall
32 Extension of the second side wall
33 Extension of the connecting wall

The invention claimed is:

1. A device for reinforcing a structural element in a motor vehicle, the device comprising:
 a reinforcing element having a longitudinal axis and configured to be arranged in a cavity of the structural element, the reinforcing element comprising walls that extend substantially in a direction of the longitudinal axis, and at least one open side that extends in the direction of the longitudinal axis,
 wherein adjoining walls of the walls that directly adjoin the open side are disposed such that extensions of the adjoining walls running in the direction of the open side and perpendicularly to the longitudinal axis converge and intersect.

2. The device as claimed in claim 1, wherein the reinforcing element has a first side wall and a second side wall, and a connecting wall that connects the side walls.

3. The device as claimed in claim 2, wherein at least one of (i) the first side wall comprises a first partial wall and a second partial wall, the partial walls being not in the same plane, and (ii) the second side wall comprises a first partial wall and a second partial wall, the partial walls being not in the same plane.

4. The device as claimed in claim 2, wherein the connecting wall is arranged such that the side walls extend on a same side of the connecting wall.

5. The device as claimed in claim 2, wherein the connecting wall is arranged such that the side walls extend on different sides of the connecting wall.

6. The device as claimed in claim 1, wherein an angle which is formed by the converging extensions is between 0° and 120°.

7. The device as claimed in claim 1, wherein the reinforcing element further comprises ribs that are oriented substantially orthogonally to the longitudinal axis of the reinforcing element, and that interconnect the first side wall and the second side wall.

8. The device as claimed in claim 1, wherein the walls are formed from a same material.

9. The device as claimed in claim 1, wherein the reinforcing element comprises at least one selected from the group consisting of metal, steel, aluminum, magnesium, plastics material, fiber-reinforced plastics material, and organic sheet material.

10. A system of a reinforced structural element in a motor vehicle, the system comprising:
 a structural element;
 a reinforcing element as claimed in claim 1, the reinforcing element being disposed in the structural element; and
 an adhesive, the adhesive interconnecting the reinforcing element and the structural element.

11. The system as claimed in claim 10, wherein the adhesive is a non-expandable adhesive or an expandable adhesive.

12. The system as claimed in claim 10, wherein the adhesive connects at least the first side wall and the second side wall to the structural element.

13. The system as claimed in claim 10, wherein the adhesive connects the connecting wall to the structural element.

14. The system as claimed in claim 10, wherein the adhesive in a region of at least one of a first joint and a second joint of the structural element forms a continuous layer such that the reinforcing element in the region is connected to both a first panel sheet and a second panel sheet.

15. The system as claimed in claim 10, wherein at least 50% of an inner circumference of the structural element, formed from a first panel sheet and a second panel sheet, in a cross section of the structural element is connected to the reinforcing element by the adhesive.

* * * * *